March 26, 1968
E. W. HAUG
3,374,651
MACHINE FOR FORMING GEARS
Filed Oct. 23, 1965
14 Sheets-Sheet 1
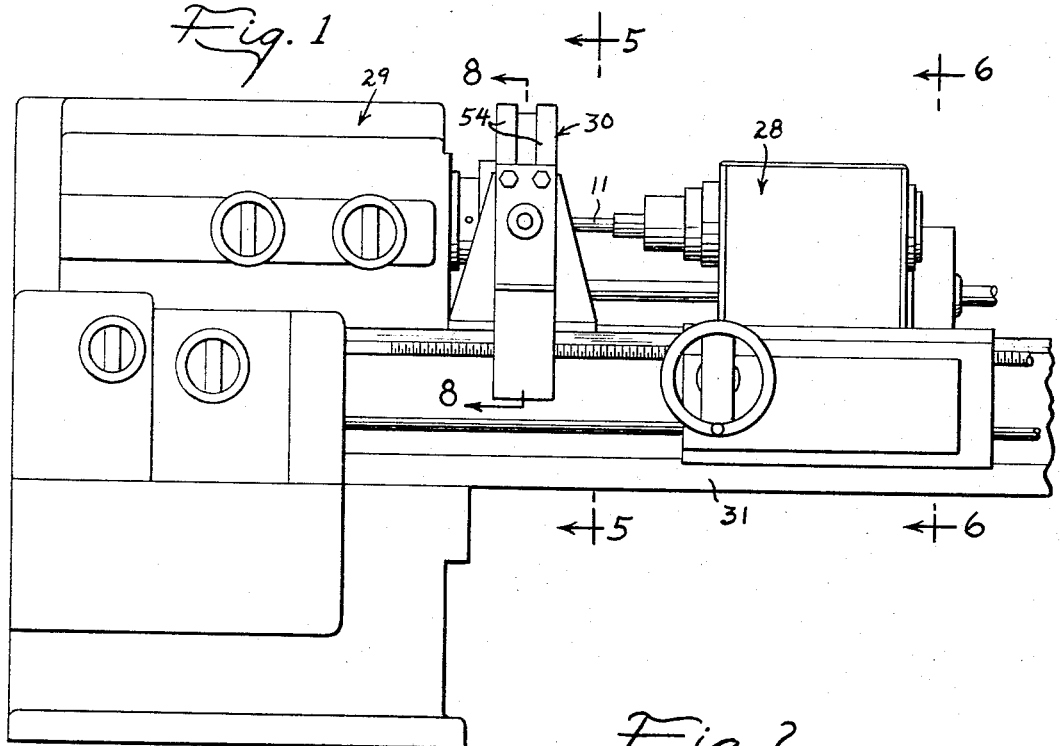
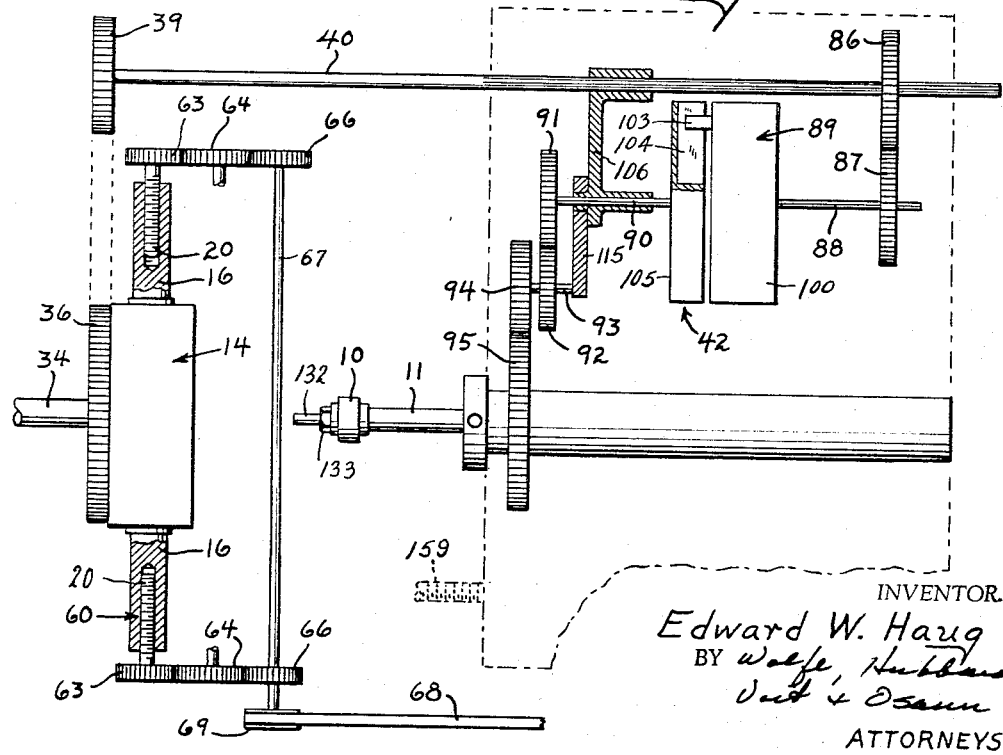
INVENTOR.
Edward W. Haug
BY Wolfe, Hubbard,
Voit & Osann
ATTORNEYS March 26, 1968     E. W. HAUG     3,374,651

MACHINE FOR FORMING GEARS

Filed Oct. 23, 1965     14 Sheets-Sheet 2

INVENTOR
Edward W. Haug
By Wolfe, Hubbard, * & *
ATTORNEYS

March 26, 1968     E. W. HAUG     3,374,651

MACHINE FOR FORMING GEARS

Filed Oct. 23, 1965     14 Sheets-Sheet 3

INVENTOR.
Edward W. Haug
BY Wolfe, Hubbard,
Voit & Osann
ATTORNEYS

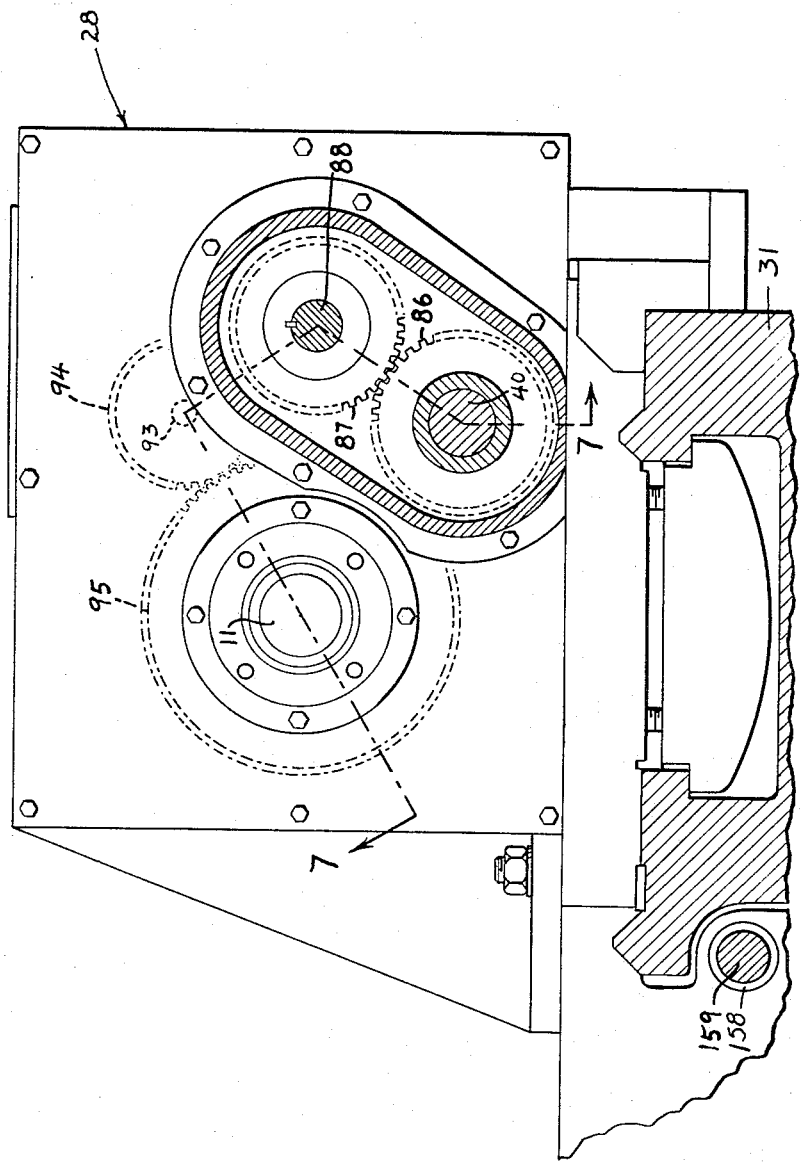

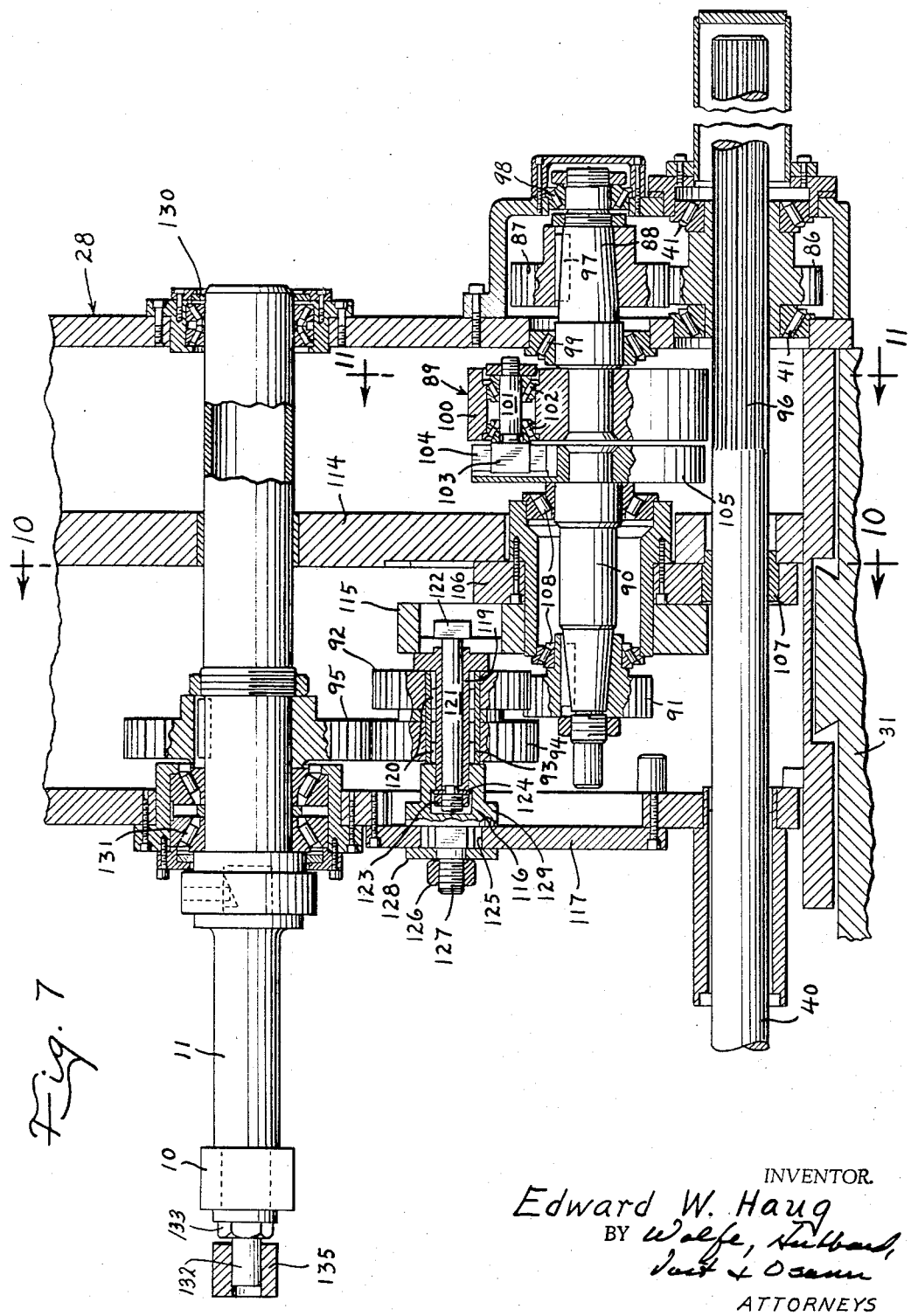

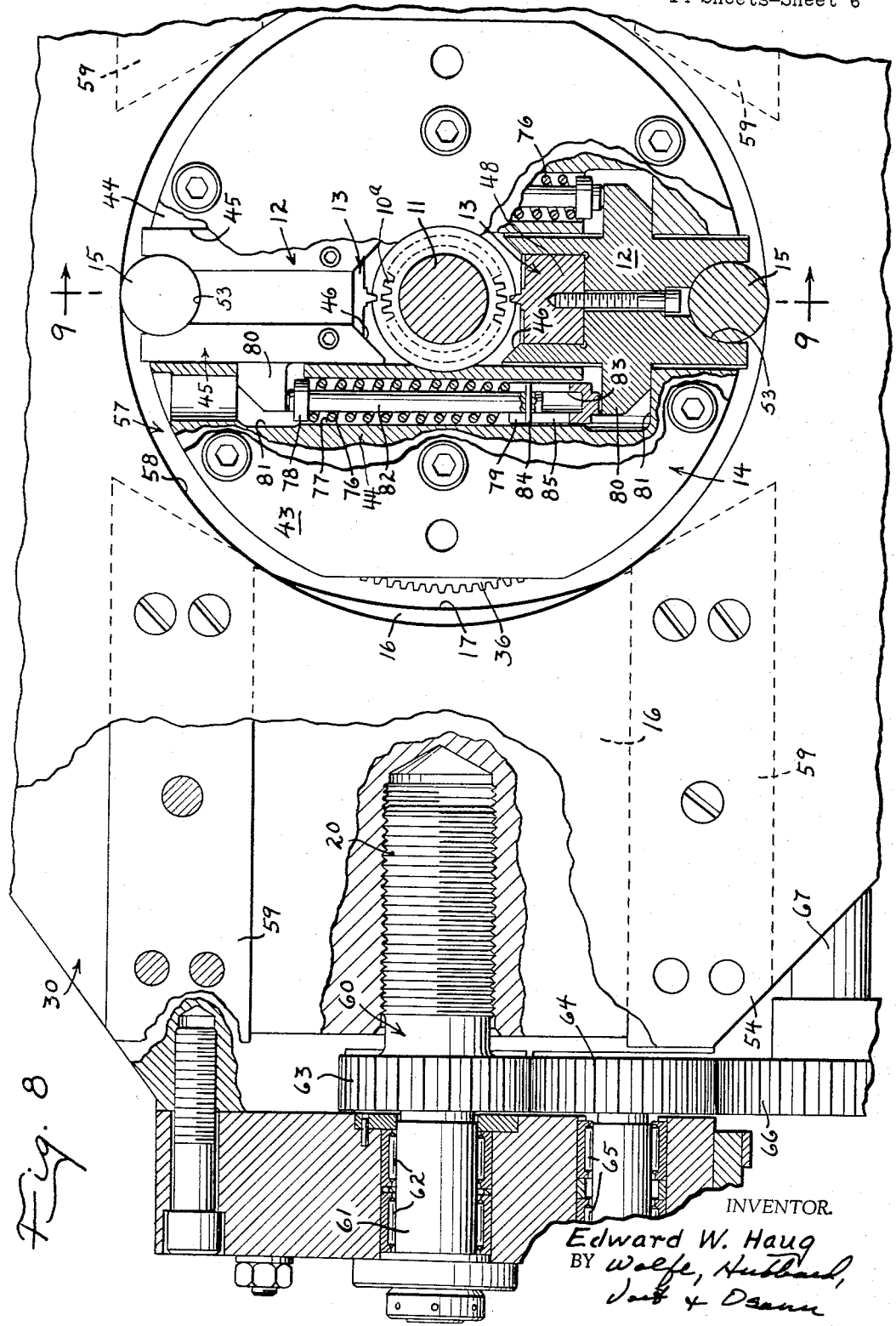

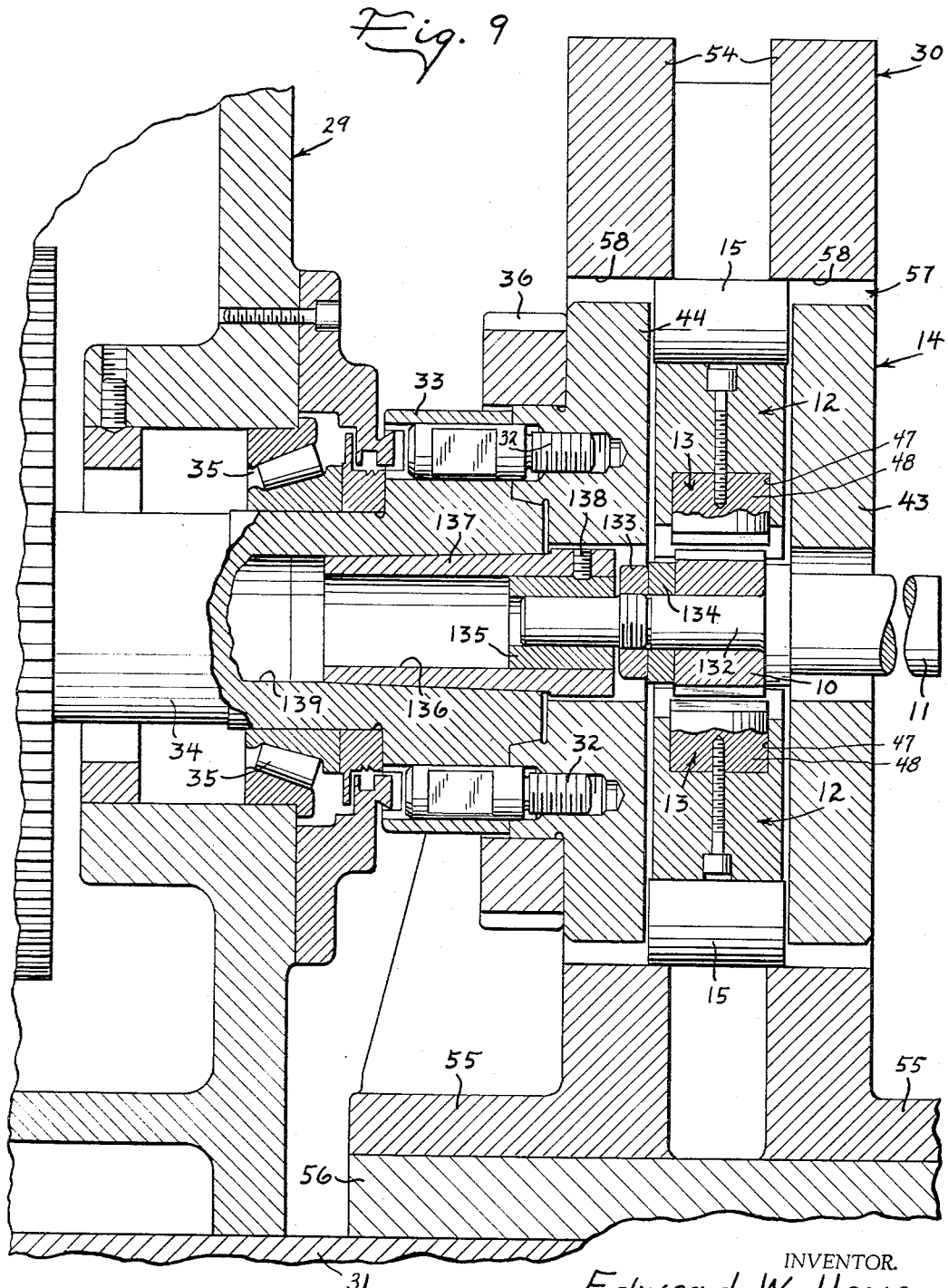

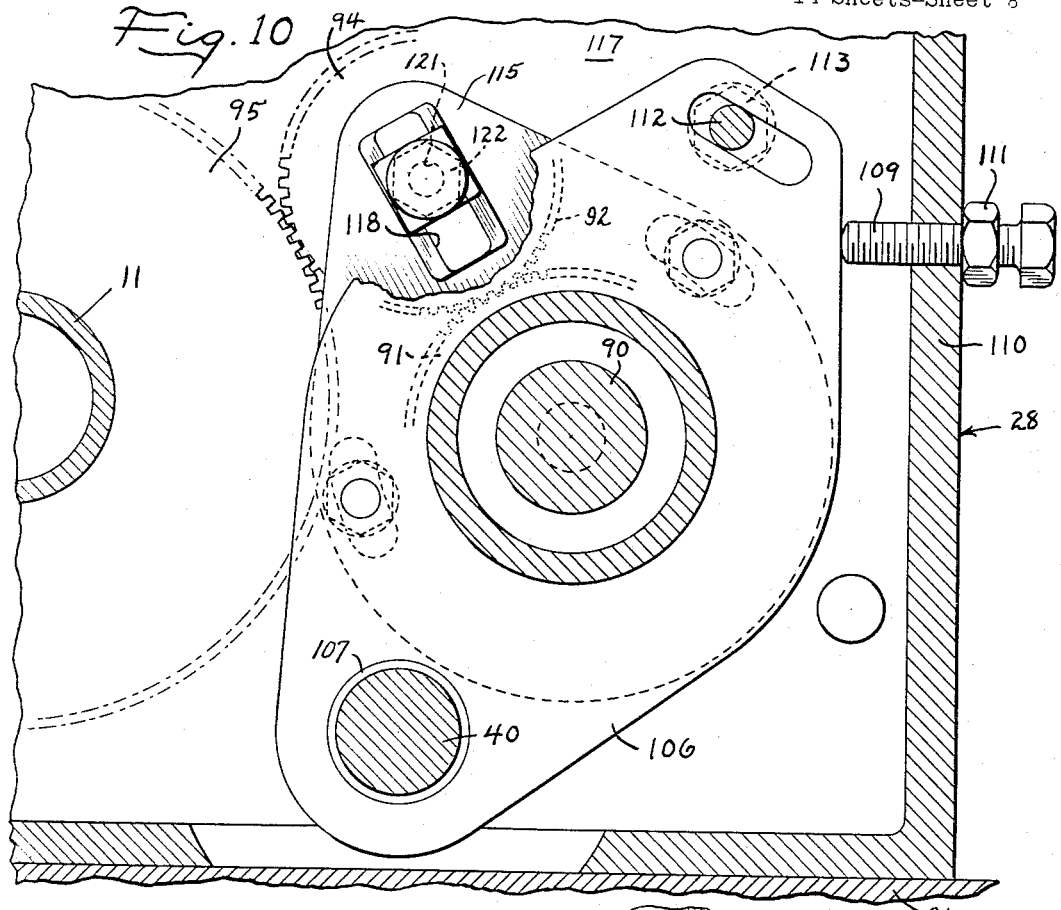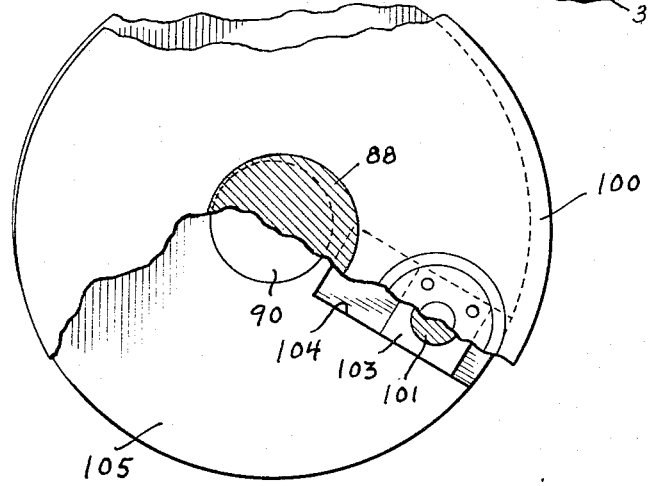

March 26, 1968  E. W. HAUG  3,374,651
MACHINE FOR FORMING GEARS
Filed Oct. 23, 1965  14 Sheets-Sheet 9
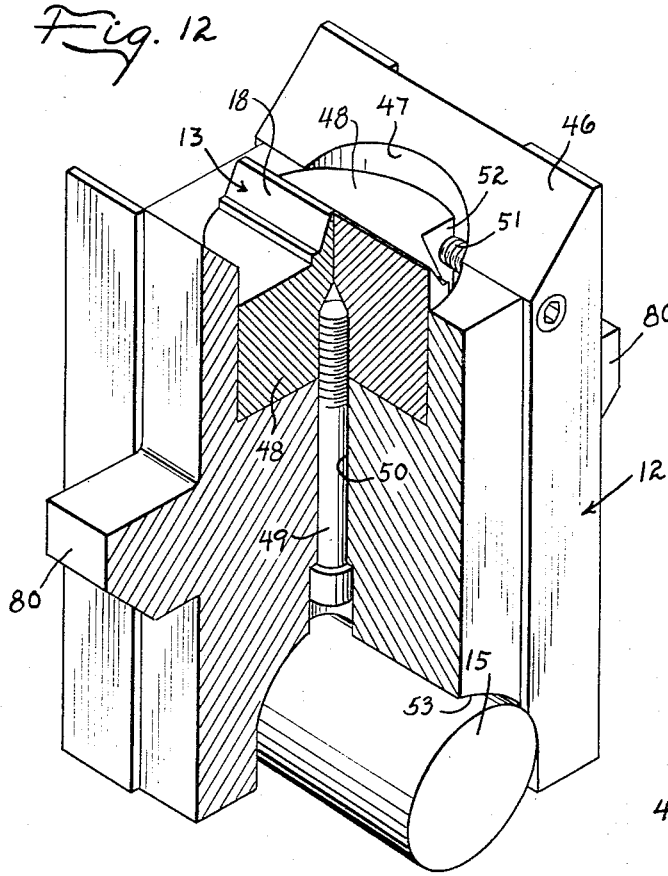
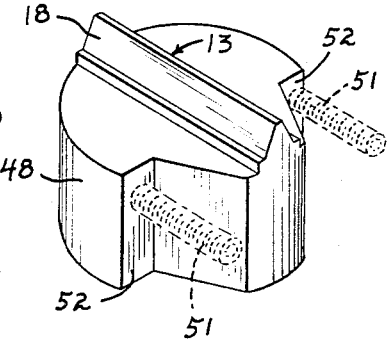
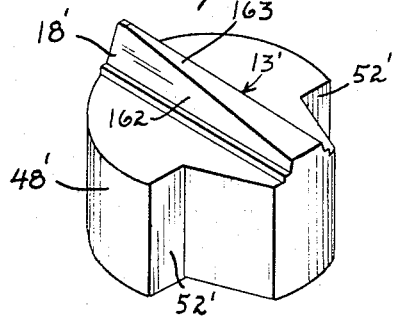
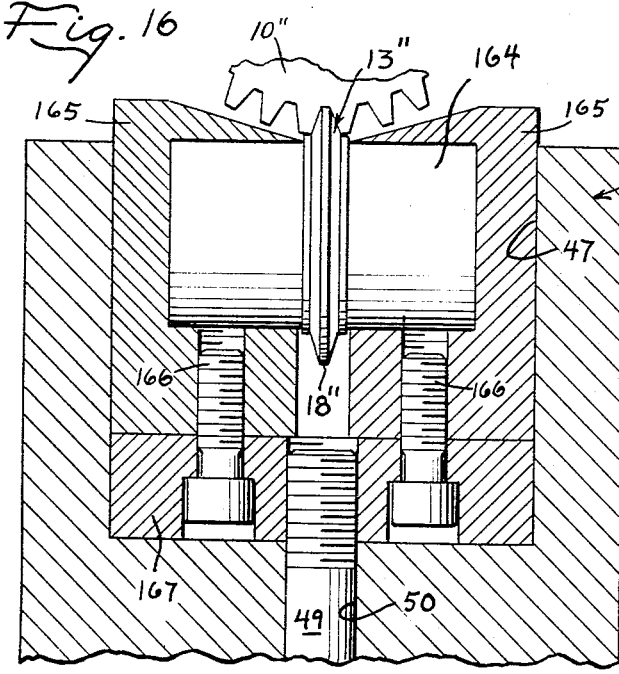
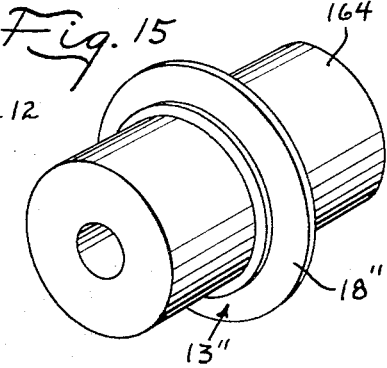
INVENTOR.
Edward W. Haug
BY Wolfe, Hubbard,
Voit & Osann
ATTORNEYS March 26, 1968   E. W. HAUG   3,374,651
MACHINE FOR FORMING GEARS
Filed Oct. 23, 1965
14 Sheets-Sheet 10
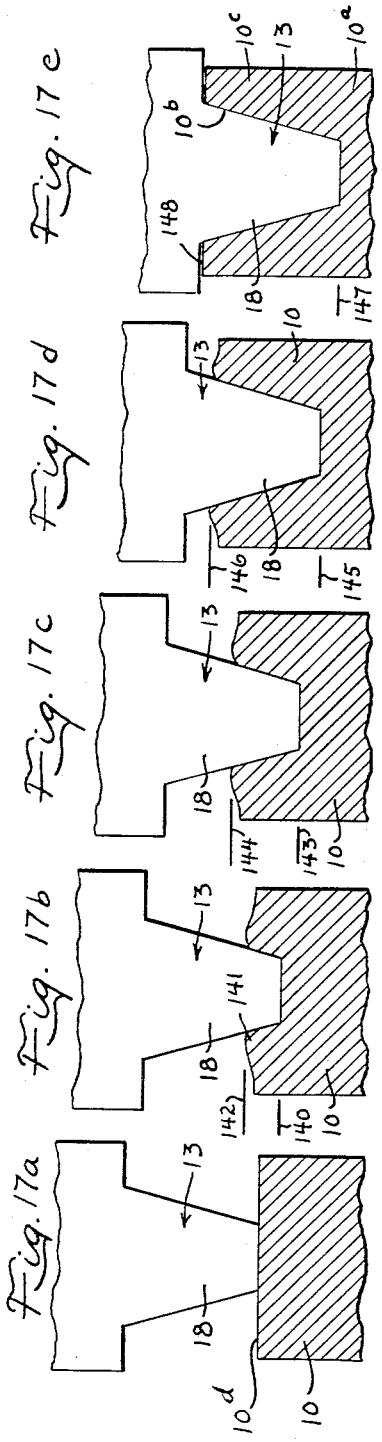
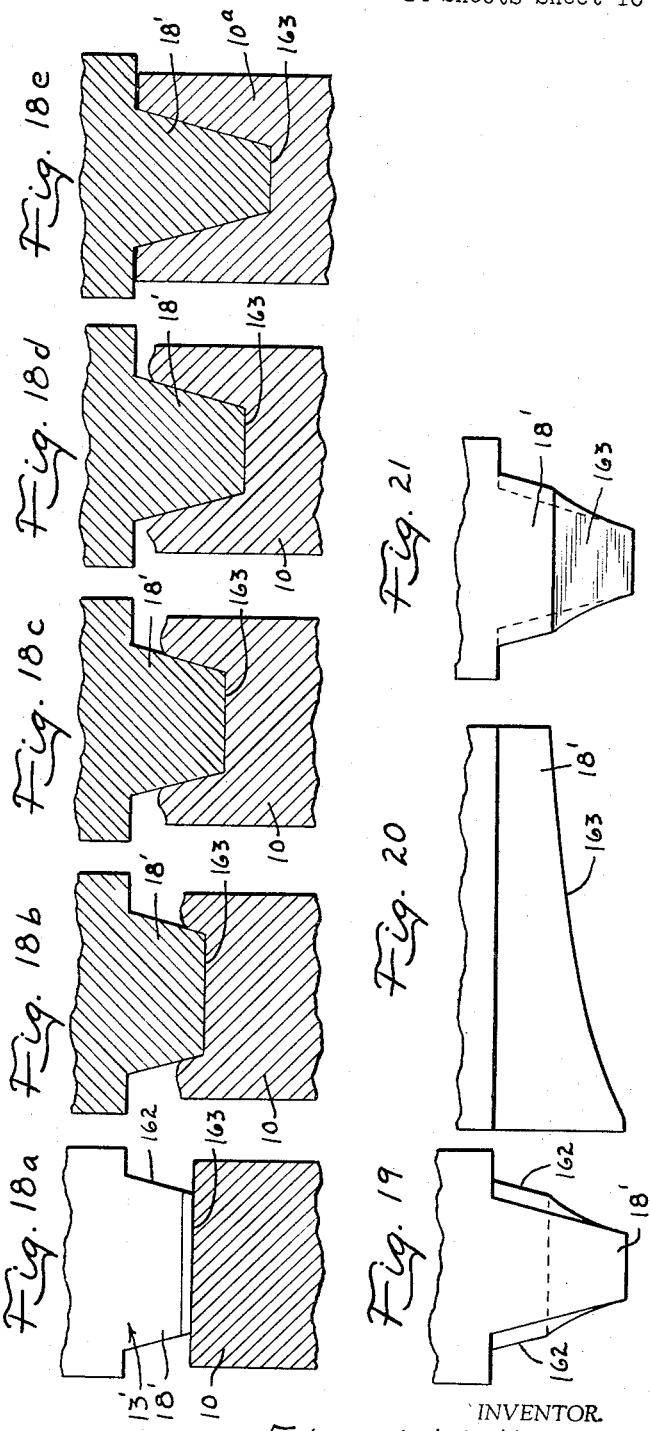
INVENTOR.
Edward W. Haug
BY Wolfe, Hubbard,
Voit & Osann
ATTORNEYS INVENTOR.
Edward W. Haug
BY
ATTORNEYS

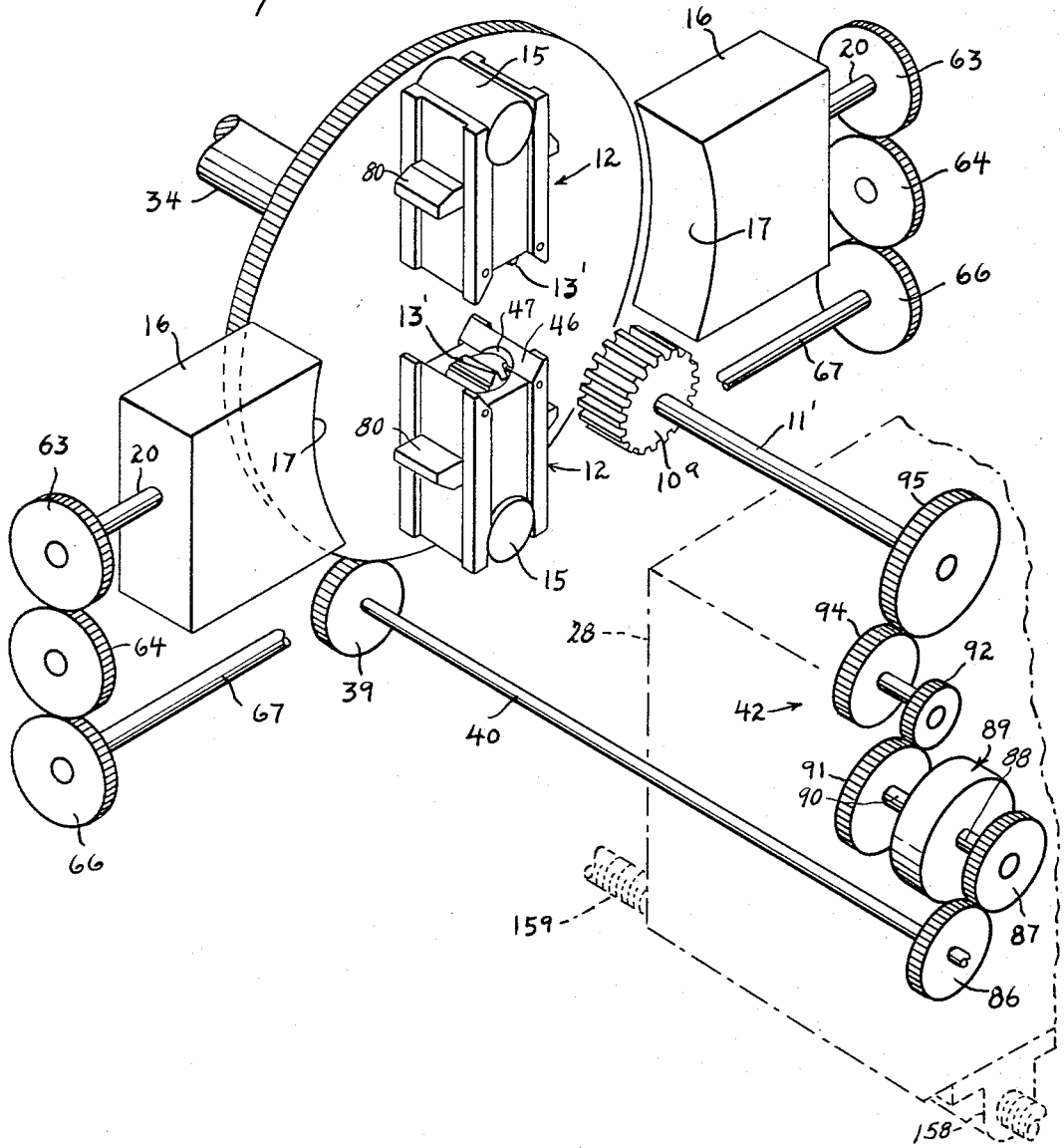

March 26, 1968 E. W. HAUG 3,374,651
MACHINE FOR FORMING GEARS
Filed Oct. 23, 1965 14 Sheets-Sheet 13

INVENTOR.
Edward W. Haug
BY Wolfe, Hubbard,
Voit & Osann
ATTORNEYS

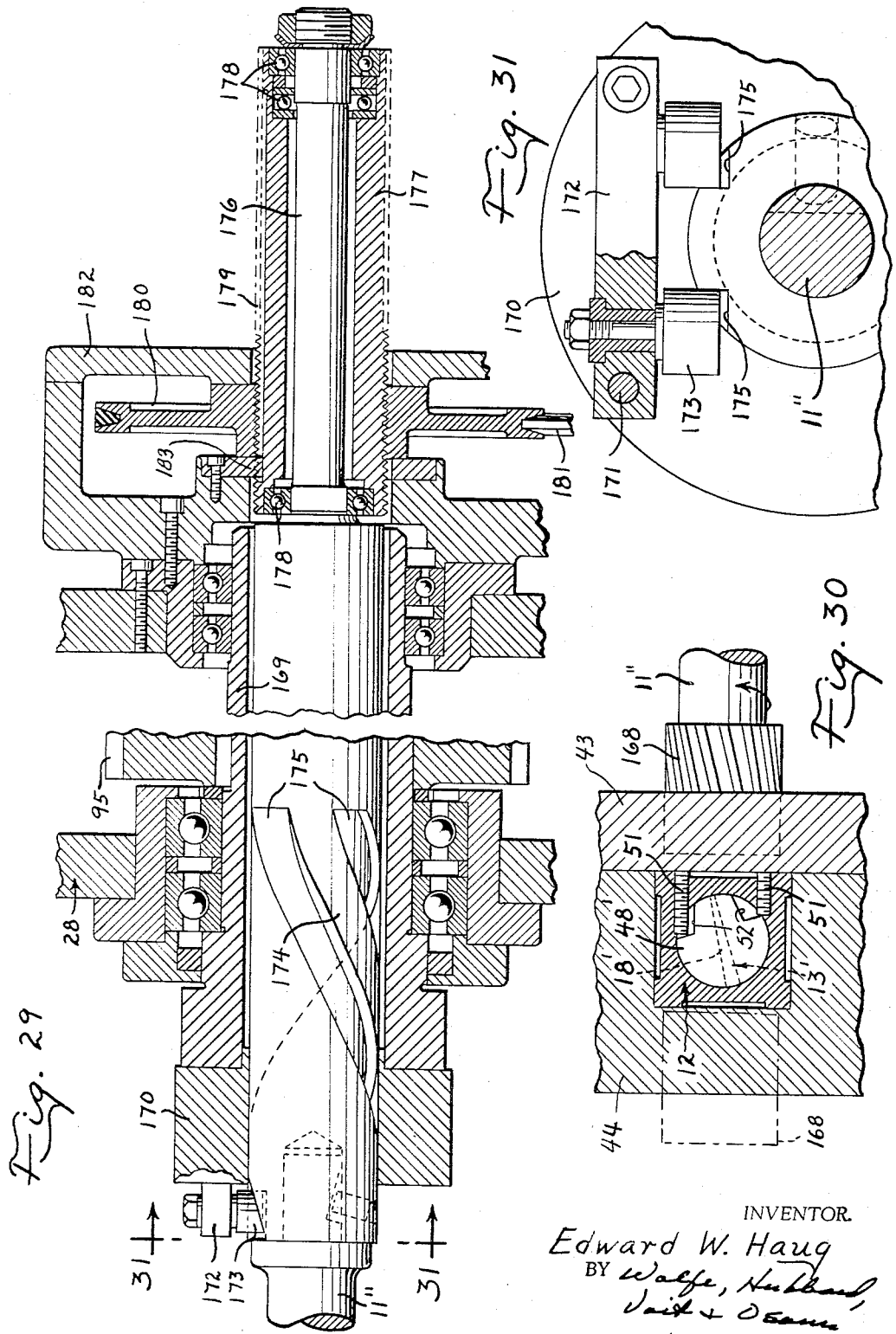

United States Patent Office 3,374,651
Patented Mar. 26, 1968

3,374,651
MACHINE FOR FORMING GEARS
Edward W. Haug, Rockford, Ill., assignor to Barber-Colman Company, Rockford, Ill., a corporation of Illinois
Filed Oct. 23, 1965, Ser. No. 503,193
21 Claims. (Cl. 72—76)

This invention relates to a machine for forming gears and the general object is to provide a new and improved machine which makes gears accurately but comparatively inexpensively.

The principal object of the invention is to provide a novel machine for forming gears by impacting the periphery of a gear blank so that metal of the workpiece is displaced to form the gear teeth and the interdental spaces.

A more detailed object is to impact the gear blank with a tool which has a shape correlated with the shape of the gear teeth to be formed and which strikes the blank radially to form the teeth.

Another object is to turn the work relative to the tool after each blow so that the tool works upon successive teeth whereby the tool makes the initial penetration in the work for each tooth and then makes progressively deeper penetrations for all the teeth until the teeth finally are formed.

The invention also resides in the novel mechanism for indexing the work relative to the tool and in the means for imparting the impacting motion to the tool.

Other objects and advantages of the invention will become apparent from the following detailed description taken in connection with the accompanying drawings, in which FIGURE 1 is a fragmentary front elevation of the machine embodying the novel features of the present invention.

FIG. 2 is a schematic view of the drives for the work and the tool.

FIG. 6 is an enlarged sectional view taken along the line 6—6 in FIG. 1.

FIG. 7 is a fragmentary sectional view taken along the line 7—7 in FIG. 6.

FIG. 8 is an enlarged fragmentary sectional view taken along the line 8—8 in FIG. 1.

FIG. 9 is a fragmentary sectional view taken along the line 9—9 in FIG. 8.

FIG. 10 is a fragmentary sectional view taken along the line 10—10 in FIG. 7.

FIG. 11 is a fragmentary sectional view taken along the line 11—11 in FIG. 7.

FIG. 12 is a perspective view of the tool and its holder, parts being broken away and shown in section.

FIG. 13 is a perspective view of the tool.

FIG. 14 is a perspective view of a modified form of the tool.

FIG. 15 is a perspective view of another modified form of the tool.

FIG. 16 is a fragmentary longitudinal sectional view of the tool shown in FIG. 15 and its mounting.

FIGS. 17a through 17e are schematic views illustrating the progressive formation of a gear by the tool shown in FIG. 13.

FIGS. 18a through 18e are schematic views showing the progressive formation of a gear by the tool shown in FIG. 14.

FIG. 19 is an enlarged fragmentary end view of the tool shown in FIG. 14.

FIG. 20 is an enlarged fragmentary side view of the tool shown in FIG. 14.

FIG. 21 is an enlarged fragmentary end view of the tool shown in FIG. 14 and shows the end opposite from that illustrated in FIG. 19.

FIG. 26 is a schematic perspective view of the drives employed when using the tool illustrated in FIG. 14.

FIG. 29 is a view similar to FIG. 7 but shows a modification of the machine for forming helical gears.

FIG. 30 is a sectional view of the tool as mounted for forming helical gears.

FIG. 31 is an enlarged fragmentary sectional view taken along the line 31—31 in FIG. 29.

Figure 3:
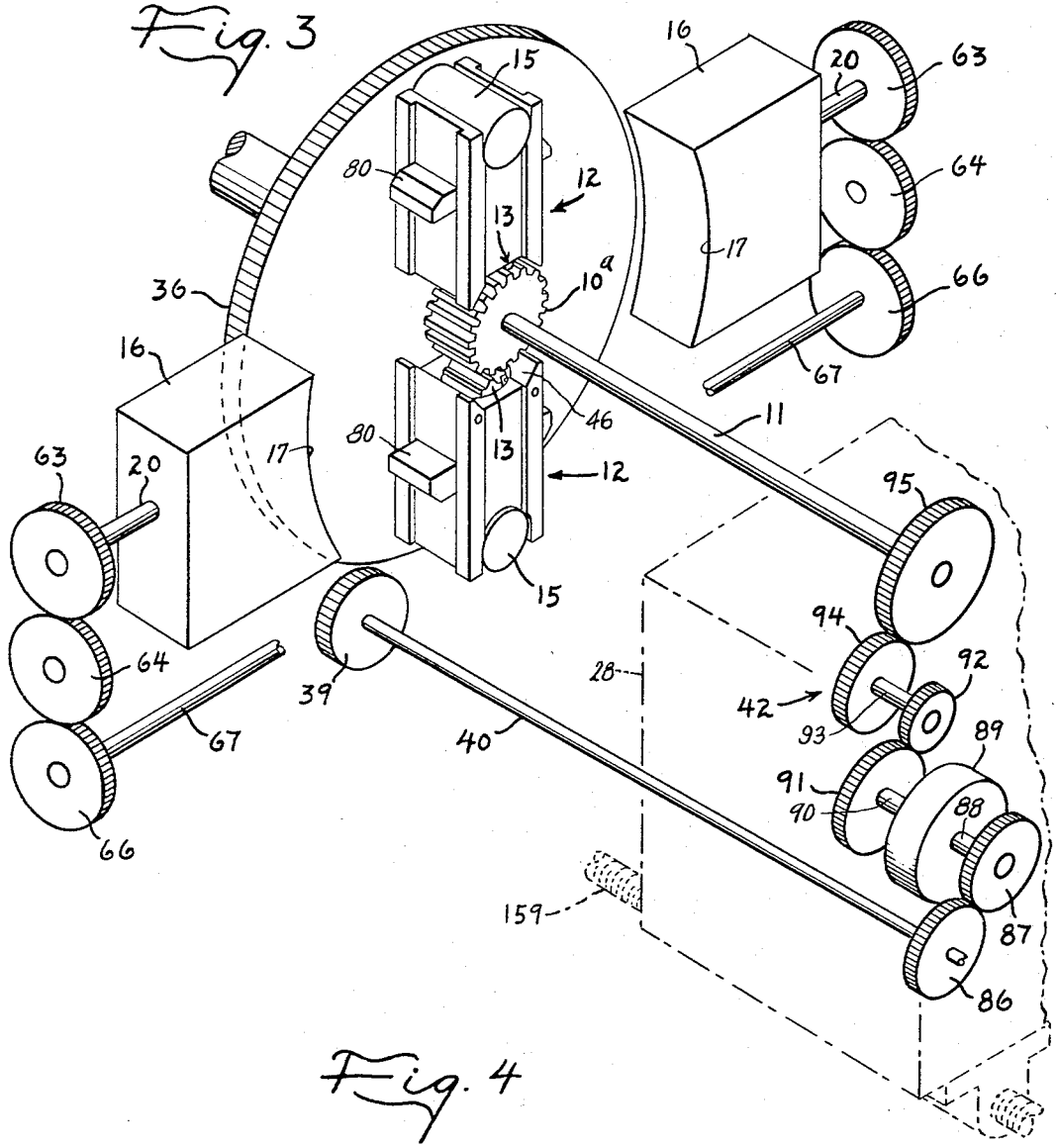
FIG. 3 is a schematic perspective view of the drives.

The present invention contemplates the formation of toothed parts such as gears in a novel manner which is accurate and yet comparatively inexpensive. To this end, a gear is made by a tool which impacts a workpiece or blank and successively displaces metal to form the teeth and interdental spaces. Thus, a gear blank 10 (FIG. 3) may be supported on a spindle 11 adjacent a tool support 12 which carries a tool 13 and which is mounted to slide radially toward and away from the periphery of the gear blank to impact the latter. Each time the tool slide 12 is retracted, the spindle 11 is turned relative to the slide through an angle equal to the angle between the teeth on the gear to be formed. The shape of the tool 13 is correlated to the shape of the gear teeth so that the teeth are formed by the successive impacts.

In one form of the invention as illustrated schematically in FIG. 3, the spindle 11 is disposed horizontally and one end projects into the center of a tool head 14. The latter is coaxial with the spindle and both the head and the spindle are mounted to turn about the spindle axis. In this instance, there are two tool slides 12 diametrically opposed and carrying identical tools 13. The slides are mounted on the tool head to turn with the latter and also to slide radially toward and away from the gear blank 10 which is mounted on the spindle between the slides.

Normally, the slides 12 are urged outwardly away from the gear blank and, twice each revolution of the tool head 14, they are cammed inwardly so that the tools 13 impact the periphery of the blank. For this purpose, cam followers in the form of rollers 15 are journaled on the outer ends of the slides to cooperate with two stationary cams 16 which are disposed on opposite sides of the tool head. Thus, each time the tool head turns 180 degrees, the followers 15 ride across the faces 17 of the cams 16 and this moves the slides inwardly to effect the impact.

In the embodiment illustrated in FIGS. 1 through 13, the shape of the tool 13 is complemental to the shape of the gear to be formed, that is, the rib portion 18 (FIGS. 12 and 13) of the tool matches the interdental space of the gear. A number of impacts is required to form each gear tooth. Accordingly, in this instance, the tool head 14 is indexed relative to the gear blank so that the successive parts of the periphery of the gear blank are presented to the tools 13 which partially form the gear teeth. The indexing is continued so that, upon each half revolution of the blank relative to the head, the gear teeth are formed further until they reach their final shape.

To cause the tools 13 to penetrate the blank 10 further upon successive impacts, the cams 16 are moved progressively inwardly so that slides 12 and hence the tools are moved further toward the axis of the spindle 11. As will be described more in detail, this movement of the cams may be achieved by mounting the latter on screws 20 which are turned continuously from a suitable power source during the formation of each gear, the cams being backed off preparatory to starting on a new gear blank.

Herein, both the work spindle 11 and the tool head 14 turn continuously and, to index the gear blank relative to the tools, the tool head and the spindle turn in the same direction but at different speeds. The speeds are correlated so that, between each impact, the spindle and the tool head turn relative to each other through an angle equal to the spacing of the teeth on the gear to be formed. In the illustrated example, the spindle turns faster than the tool head, and, since there are two impacts for each revolution, the spindle gains the distance of a tooth each half revolution.

Figure 4:
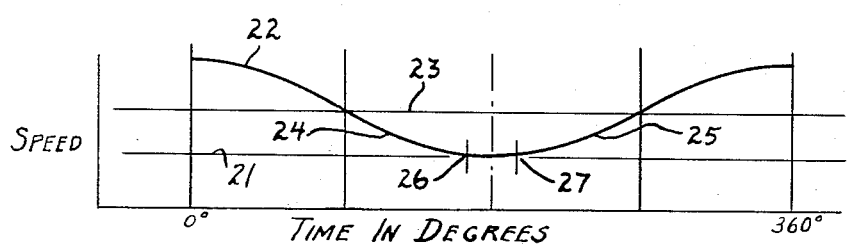
FIG. 4 is a graph showing the relative speeds of the tool and the work.
Figure 5:
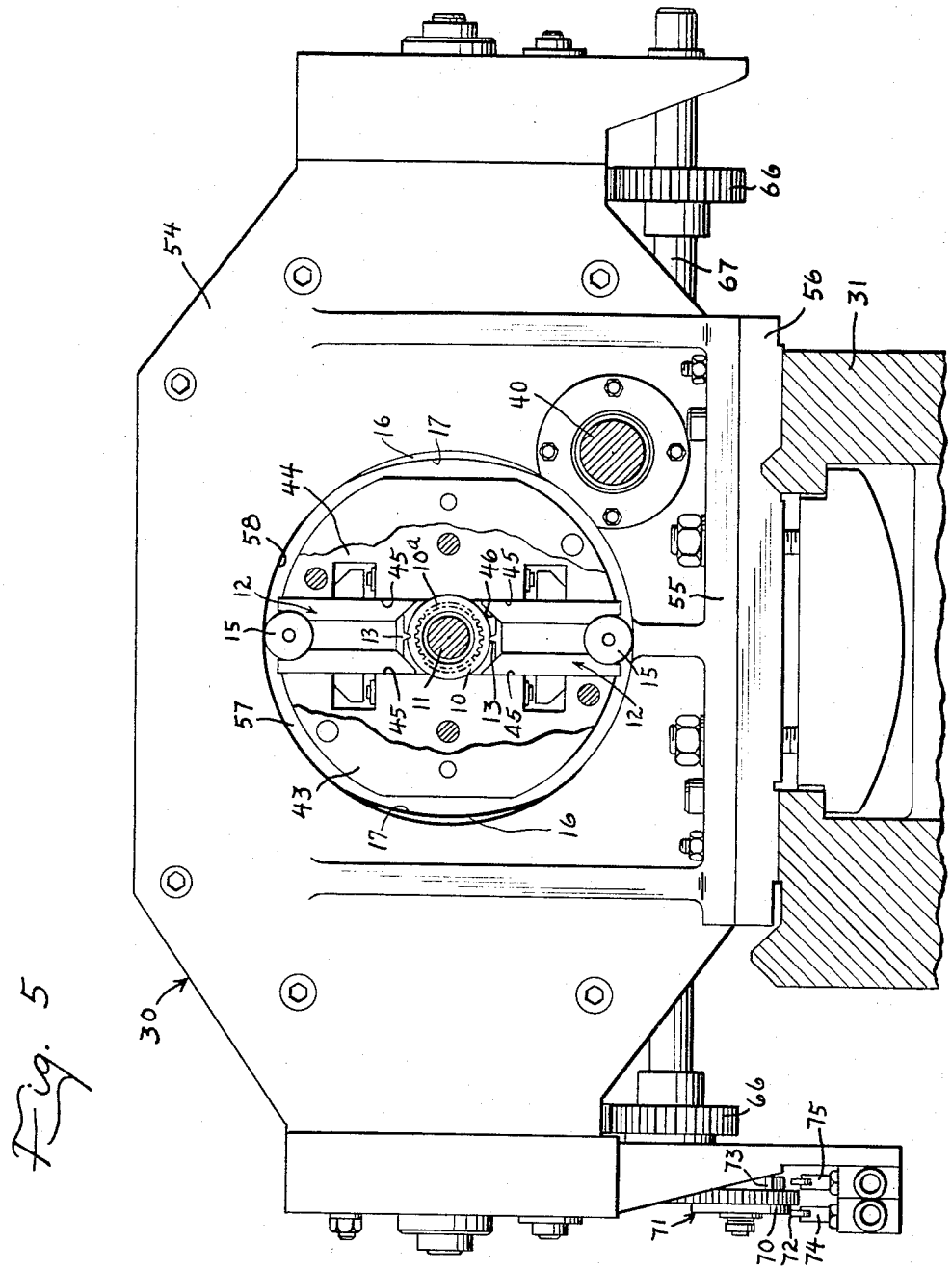
FIG. 5 is an enlarged sectional view taken along the line 5—5 in FIG. 1.
Figure 22:
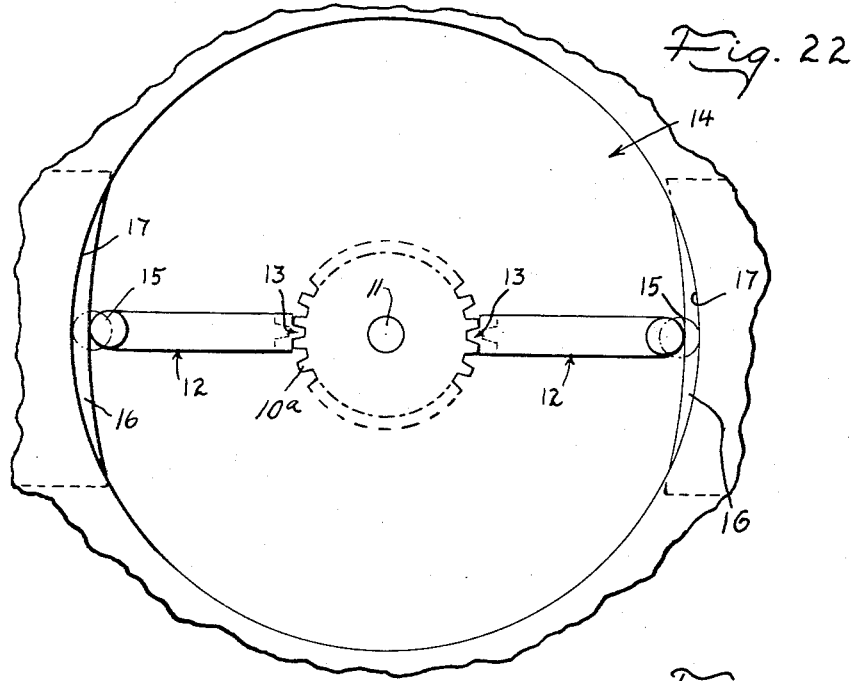
FIG. 22 is a schematic view illustrating the head for carrying the tools.

Also, the speed of either the spindle 11 or the tool head 14 is cyclical, that is, the speed alternately increases and decreases so that, at the time the tools 13 impact the gear blank 10, the spindle and the head are turning at substantially the same speed to give a period of relative dwell between the two. In the present instance, the tool head is turned at a constant speed while the speed of the spindle is varied. Thus, as illustrated in FIG. 4, the tool head turns at a speed represented by the line 21 while the actual speed of the spindle is represented by the curve 22. The average speed of the spindle, represented by the line 23, is greater than the tool head speed. The ratio of the speed of the tool head to the speed of the spindle equals the number of teeth on the gear to be formed divided by the number of teeth plus two where there is an impact every half revolution. For example, in making a 24-tooth gear, this average speed of the spindle would be one-twelfth greater than the speed of the head.

The cam followers 15 engage the cams 16 at the point 24 (FIG. 4) in the cycle and remain in contact until the point 25 is reached. During this period of contact, the tools 13 are impacting the work only during the shorter period represented by the distance between 26 and 27. It will be seen that the speeds of the spindle and the tool head are substantially the same during this period of impact.

As illustrated in FIG. 1, a standard lathe may be modified to practice the invention. Thus, the work spindle 11 is supported on the carriage 28 and the tool head 14 is driven by the head stock 29. An auxiliary support 30 clamped to the bed 31 of the lathe serves to absorb the reaction of the impact force. The auxiliary support also serves to mount the cams 16 for movement toward and away from the axis of the work spindle.

The tool head 14 is a wheel disposed within the auxiliary support 30 and clamped by screws 32 to a radial flange 33 (FIG. 9) on the outer end of the head stock shaft 34 which is driven in the usual manner from the main power source of the lathe. The head stock shaft, which is journaled on the head stock by bearings 35, also drives the work spindle 11 and, for this purpose, a spur gear 36 is keyed to a flange 37 on the back side of the tool head. The gear 36 (FIGS. 2 and 3) meshes with a gear 39 fast on a horizontal shaft 40 which extends from the head stock 29 to the carriage 28 and is journaled in the latter by means of bearings 41 (FIG. 7). Through gearing 42, to be described later in detail (see FIGS. 2 and 3), the shaft 40 drives the work spindle 11.

Herein, the tool head 14 is made up of a generally circular cover plate 43 (FIGS. 5, 8 and 9) and a substantially round body 44 having a centrally located slot on the front face. The opposing faces 45 of the slot constitute guides for the tool slides 16. Each slide is composed of a rectangular block which slides between the plates 43 and the surfaces 45. At its inner end, the slide is formed with a generally V-shaped recess 46 which is counterbored at 47 (FIG. 12) to receive a cylindrical plug 48. The latter is formed integrally with the tool 13 and is secured in the counterbore 43 by a bolt 49 which projects through a center bore 50 in the block 12 and is threaded into the outer end of the plug 48. The plug is prevented from turning in the block by set screws 51 which are threaded laterally through the block and abut shoulders 52 (FIGS. 12 and 13) defined by notches cut in the plug. At their outer ends, the blocks 12 are formed with semi-cylindrical outer seats 53 which receive cylindrical rollers constituting the cam followers 15.

The auxiliary support 30 for the tool head 14 comprises two parallel plates 54 (FIG. 9) disposed in vertical planes perpendicular to the axis of the work spindle 11 and spaced apart a distance less than the length of the cam followers 15. Lateral flanges 55 on the lower ends of the plates 54 are fixed to a base 56 which, in turn, is clamped to the lathe bed 31. The plates 54 are formed with central holes 57 which are somewhat larger in diameter than the tool head 14 so that the cam followers 15 span the plates 54 and ride on the internal surfaces 58 on these plates.

The cams 16 which force the tool slides 12 inwardly each half revolution of the tool head 14 herein are flat blocks (FIGS. 5 and 8) disposed between the plates 54 of the auxiliary support 30 and on opposite sides of the tool head. The cam blocks slide horizontally between the plates 54 and between spacers 59 clamped between the plates. The inner ends of the cam blocks are formed with the arcuate surfaces 17 over which the cam followers 15 roll. The radius of the cam surfaces 17 is greater than the radius of the holes 57 in the plates 54 so that, as shown in FIG. 8, the cam surfaces may project in beyond the surfaces 58 and still generally merge with the latter. Thus, the cam followers roll smoothly from the surfaces 58 to the cam surfaces 17 which cam the slides 12 inwardly to impact the tools 13 against the gear blank 11.

To advance each cam 16 progressively inwardly, one end portion of a shaft 60 (FIG. 8) is threaded into the outer end of the cam 16 and constitutes the screw 20. The outer end portion 61 of the shaft is journaled by bearings 62 in the auxiliary support 30 and a spur gear 63 is integral to the shaft intermediate the ends thereof. The gear 63 meshes with an idler gear 64, also journaled on the support 30 by bearings 65, and the idler gear meshes in turn with a pinion 66. As shown in FIG. 2, similar sets of gearing are provided for both of the cams 16 and the two pinions 66 are fast on a common shaft 67 which is driven from a suitable source (not shown) through a belt 68 (FIG. 2) and a pulley 69 secured to the shaft 67. The latter is driven continuously during the gear forming operation so that the cams 16 move in progressively and cause successively deeper penetrations of the gear blank hole 10 by tools 13. Upon the completion of each workpiece, the shaft 67 is reversed to retract the cams 16. A cam 70 (FIG. 5) driven by the shaft 67 through speed reduction gearing 71 carries dogs 72 and 73 which actuate limit switches 74 and 75. These switches act through a suitable control circuit (not shown) to limit the sliding of the cams 16 in both directions.

To hold the followers 15 against the surfaces 58 on the plates 54 and the cam surfaces 17, the tool slides 12 are urged outwardly by compression springs 76 (FIG. 8). In this instance, two springs are employed and are disposed in bores 77 in the spacers 44 of the tool head 14 on opposite sides of the tool slides 12. Each spring 76 acts between two plungers 78 and 79 which slide in the associated bore 77 and bear against lugs 80 integral with the slides 12 and projecting into recesses 81 in the spacers 44. Thus, the springs 76 continuously urge the plungers 78 and 79 outwardly which, in turn, urge the tool slides 12 radially outwardly to hold the cam followers 15 against the surfaces 17 and 58. Each spring 76 is guided by a rod 82 which is secured at one end to the plunger 78. The other end of the rod projects into a bore 83 in the other plunger 79. A pin 84 extends transversely through this end of the rod and the ends of the pin project into longitudinal slots 85 in the plunger 79 so that the rod may telescope with the plunger. Thus, the two plungers 78 and 79 may slide toward and away from each other in the bore 77.

To turn the gear blank 10 in a synchronism with the tool head 14, the spindle 11 is driven by the gear 39 (FIGS. 2, 3 and 7) which meshes with the gear 36 on the tool head and is fast on the shaft 40 extending horizontally from the head stock 29 to the carriage 28. The shaft 40 drives the spindle 11 through the gearing 42 which imparts the cyclical motion so that the spindle alternately turns at the same speed as the tool head and then faster than the head. In general, this gearing 42 includes a gear 86 driven by the shaft 40 and meshing with a gear 87 on a shaft 88. The latter constitutes the input to a mechanism 89 which imparts a cyclical motion to the output shaft 90. The latter carries a spur gear 91 which meshes with a gear 92 on a shaft 93. A gear 94 keyed to the shaft 93 meshes with a gear 95 fast on the spindle 11 and completes the drive from the tool head to the spindle.

Specifically, the shaft 40 projects into the carriage 28 as illustrated in FIG. 7. The end portion of the shaft is splined to the gear 86 as indicated at 96 and the gear slides on the spline to permit the carriage to be moved on the lathe bed 31 while maintaining the drive between the shaft 40 and the gear 86. The latter is journaled in the carriage by the bearings 41 and meshes with the gear 87 which is secured to the shaft 88 by a key 97. The shaft 88 is journaled in the carriage by bearings 98 and 99 and a plate 100 is integral with this shaft.

At a point spaced radially from the shaft 88, a stub shaft 101 (FIGS. 7 and 11) is journaled in the plate 100 by bearings 102. A square block 103 is fast on the free end of the shaft 101 and slides in a radial slot 104 in a plate 105 opposing the plate 100. The plate 105 is integral with the shaft 90 which is supported in the carriage 28 for lateral shifting so that its axis may be offset selectively from the axis of the input shaft 88. With this offset, the plate 100 turns at a constant speed and the plate 105 turns at a varying speed but at an average speed equal to the speed of the plate 100. The degree of variation in speed of the plate 105 from the lowest speed to the highest, however, depends upon the offset of the axes of the shafts 88 and 90. Thus, the plates 100 and 105 comprise the mechanism 89 for producing the cyclical motion of the spindle 11. The gears 92 and 94 from the mechanism to the spindle 11 are change gears and are selected to turn the spindle at a speed faster than the tool head 14 to achieve the relative indexing between the tools 13 and the gear blank 10. At the same time, the shafts 88 and 90 are offset an amount by which the slowest speed of the spindle equals the speed of the tool head.

To vary the offset of the shaft 88 and 90 and hence the cyclical variation in the speed of the spindle 11, the shaft 90 is mounted to swing about the axis of the shaft 40 from one position of adjustment to another. For this purpose, a support 106 (FIGS. 7 and 10) is journaled on the shaft 40 by a bearing 107 and support the shaft 90 for rotation by bearings 108. Thus, the support 106 may be swung about the axis of the shaft 40 to vary the amount the shaft 90 is offset from the shaft 88. Such swinging of the support 106 is achieved by a screw 109 threaded through the carriage housing 110 (FIG. 10) and abutting against a side of the support so that the latter is turned back and forth about the shaft 90 by threading the screw 109 in and out of the housing. The adjusted position of the screw is maintained by a nut 111 which is threaded on the screw and is turned up against the housing 110 after the adjustment is made by a bolt 112 and nut 113 which clamps the support to a partition 114 in the carriage housing.

The drive from the shaft 40 to the spindle 11 is completed through the spur gears 91, 92, 94 and 95 (FIGS. 2 and 7). The gear 91 is keyed to the shaft 90 and meshes with the change gear 92 which is fast on the shaft 93. The latter is supported at one end by a plate 115 which is rotatably mounted on the support 106, the other end of the shaft being supported by a collar 116 clamped to a wall 117 of the carriage 28. Also fast on the shaft 93 is the change gear 94 which meshes with the gear 95, the latter gear being keyed to the spindle 11.

The shaft 93 is mounted in such a manner that the gears 91, 92, 94 and 95 may be brought back into meshing engagement after the support 106 is turned to adjust the angular position of the shaft 90. A part of this mounting is the plate 115 which turns on the support 106. Also, as shown in FIG. 10, the shaft 93 can be moved radially of the shaft 90 by being supported in a slot 118 formed in the plate 115. For this purpose, the shaft 93 is a hollow sleeve journaled on a hollow shaft 119 by means of bearings 120. A bolt 121 projects through the shaft 119 and the head 122 of the bolt is adjacent the slot 118 while the other end is threaded into a nut 123 which clamps a washer 124 against the near end of the shaft 119. Thus, when the bolt 121 has been moved in the slot 118 to position the shaft 93 properly, the position is held by tightening the nut on the bolt to clamp the bolt head 122 against the plate 115.

Turning of the plate 115 on the support 106 and sliding of the bolt 121 in the slot 118 is permitted by mounting the collar 116 in a slot 125 in the wall 117 of the carriage housing. The collar is held in position on the wall 117 by a nut 126 which is threaded on a stud 127 rigid with the collar and which clamps a washer 128 and a flange 129 against opposite sides of the wall. With this arrangement, the nuts 111, 113, 123 and 126 are loosened and the support 106 is turned by the screw 109 to obtain the desired offset of the shaft 90 relative to the shaft 88. Then, the nuts 111 and 113 are tightened to clamp the support 106 in position. Next, the plate 115 is turned about the support and the bolt 121 shifted in the slot 118 to bring the gear 92 into mesh with the gear 91 and the gear 94 into mesh with the gear 95. Finally, the nuts 123 and 126 are tightened.

The spindle 11 is journaled in the carriage 28 by bearings 130 and 131 (FIG. 7) and projects forwardly toward the head stock 29 where the reduced end portion 132 (FIG. 9) of the spindle projects between the tool slides 12. The gear blank 10 is received on this end portion and held in place by a nut 133 threaded on the portion 132 and acting through a washer 134. Beyond the nut, the end portion 132 of the spindle projects into a cylindrical bearing 135 which is disposed in the bore 136 of a hollow tapered sleeve 137 where it is held by a set screw 138. The sleeve 137 is pressed into a complementally shaped bore 139 in the drive spindle 34 of the head stock 29.

FIGS. 17a through 17e illustrate the manner in which the tools 13 form the gear upon successive impacts, these views showing the first and last impacts and several intermediate impacts which are reduced in number for simplicity of explanation. A comparison of FIGS. 17a and 17e illustrates that the starting diameter of the gear blank 10 is less than the final diameter of the gear $10^a$ which ultimately is formed. Thus, metal is displaced from that portion of the blank which becomes an interdental space $10^b$ and flows to each side of this space to form a part of a gear tooth $10^c$. On the first impact, the rib 18 of the tool 13 penetrates the surface $10^d$ of the gear blank to a depth 140 (FIG. 17b) and metal is displaced from beneath the rib and, as indicated at 141, flows to a level 142 above the original surface $10^d$. Upon the next impact, the tool penetrates further to the level 143 and more metal is displaced at the sides to the level 144 (FIG. 17c). Similarly, the next impact results in the rib 18 penetrating to the depth 145 and displaced metal flowing up to the level 146 (FIG. 17d). The rib of the tool penetrates to the level 147 (FIG. 17e) on the final impact, this being the ultimate depth of the interdental space $10^b$. At the same time, the displaced metal reaches the level 148 where the teeth $10^c$ of the gear $10^a$ are given their final formation.

The manner in which the tools 13 impact the gear blank 10 is illustrated in FIGS. 22 and 23a through 23d. For forming a 24-tooth gear, the axis of the plate 105 is offset from the axis of the plate 100 by a distance which is equal to one-twelfth of the radial distance of the stub shaft 101 from the axis of the plate 100. Thus the lowest cycle speed of spindle 11 is one-twelfth below its average speed. The change gears 92 and 94 increase the average speed of the spindle 11 by one-twelfth over that of the tool head 14 so that the gear blank 10 gains the angle of one tooth each half-revolution.

Figure 23A:
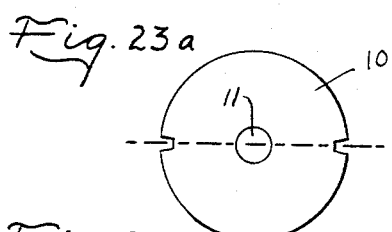
FIGS. 23a through 23d are schematic views illustrating the sequence in which the gear teeth are formed.
Figure 23B:
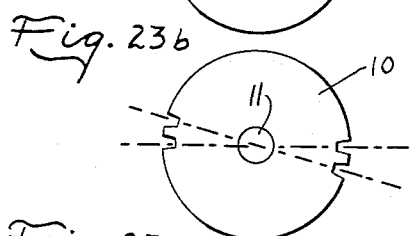
Figure 23C:
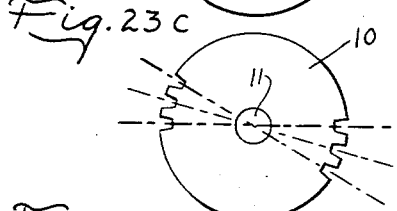
Figure 23D:
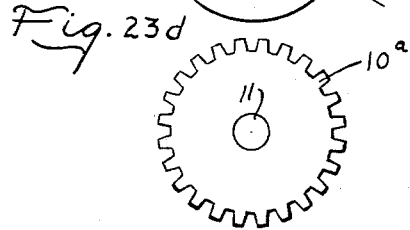

As the cam followers 15 reach the centers of the cams 16, the speeds of the spindle 11 and the tool head 14 are approximately the same and the slides 12 are moved inwardly to impact the tools 13 against the periphery of the gear blank. If the interdental spaces $10^b$ are considered as being numbered from 1 through 24, the tools begin to form spaces 1 and 13 on the first impact (FIG. 23a). The tools are retracted by the springs 76 upon continued rotation of the tool head and spindle and the spindle speed increases during the next quarter-revolution and then decreases to the speed of the tool head during the next quarter-revolution. The increase in spindle speed is such that the gear blank gains on the tool head by an angle equal to the space of one gear tooth during the half-revolution. At the end of this half-revolution, the cams 16 again cause the tools 13 to impact the gear blank and this time the tools form the spaces 2 and 14 (FIG. 23b). Similarly, the next half-revolution causes the gear blank to index relative to the tools through the distance of one tooth and the tools impact at the spaces 3 and 15 (FIG. 23c). This is repeated until, finally, the tools impact at the spaces 12 and 24 (FIG. 23d). Thereafter, the cycle is repeated to continue the formation of the gear teeth and interdental spaces.

Figure 24:
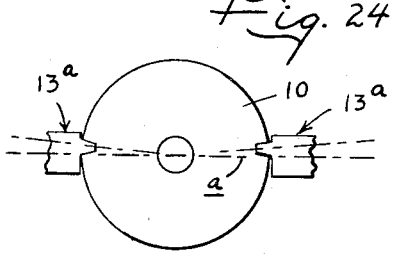
FIG. 24 is a schematic view illustrating the manner in which a gear with an odd number of teeth is formed.
Figure 25:
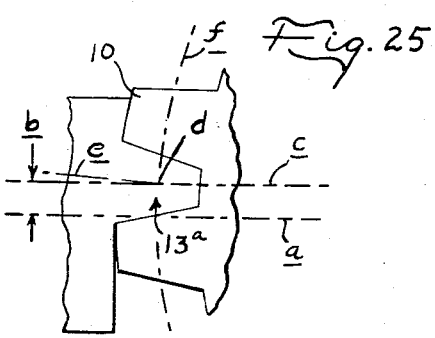
FIG. 25 is a fragmentary enlargement of a portion of FIG. 24.

The invention may also be used to form gears with an odd number of teeth. In this case, the tools $13^a$ (FIGS. 24 and 25) oppose each other on opposite sides of the gear blank 10 but are offset from the diameter $a$ of the blank. The amount of offset is determined by drawing a radius at an angle $b$ equal to one-half of the pitch angle of the gear to be formed. Then, a line $c$ is drawn parallel to the diameter $a$ and through the point $d$ which is defined by the intersection of the radius $e$ and the pitch circle $f$ of the gear. The amount of offset is equal to the distance between the diameter $a$ and the line $c$. The tools $13^a$ are shaped to compensate for the offset.

Figure 27:
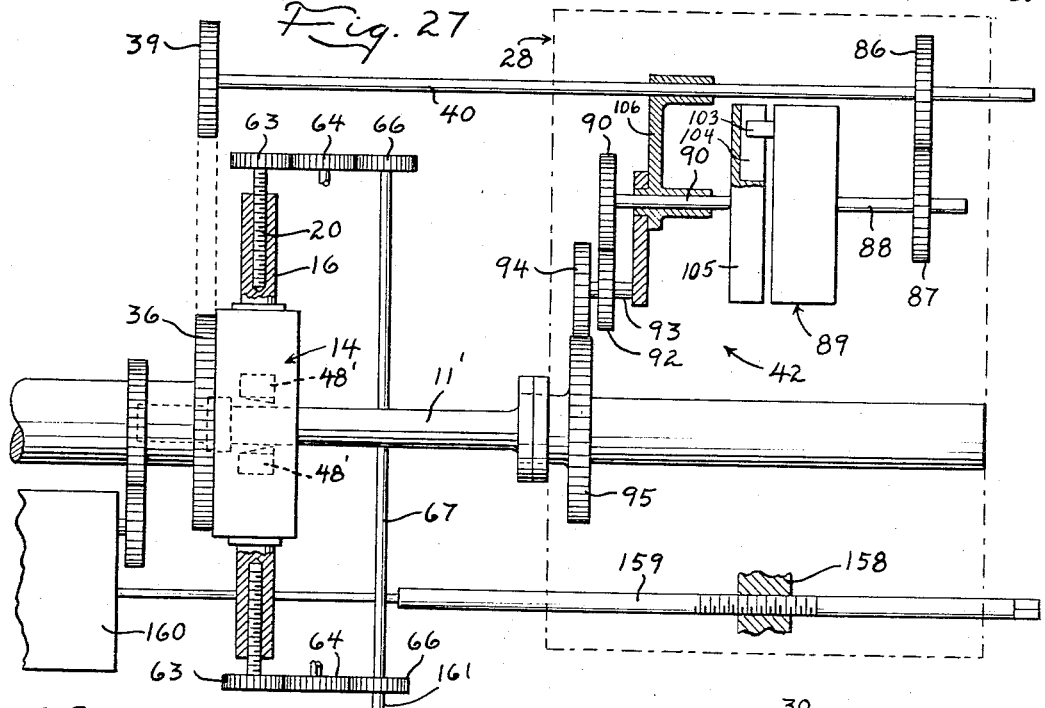
FIG. 27 is a schematic view of the drive shown in FIG. 26.
Figure 28:
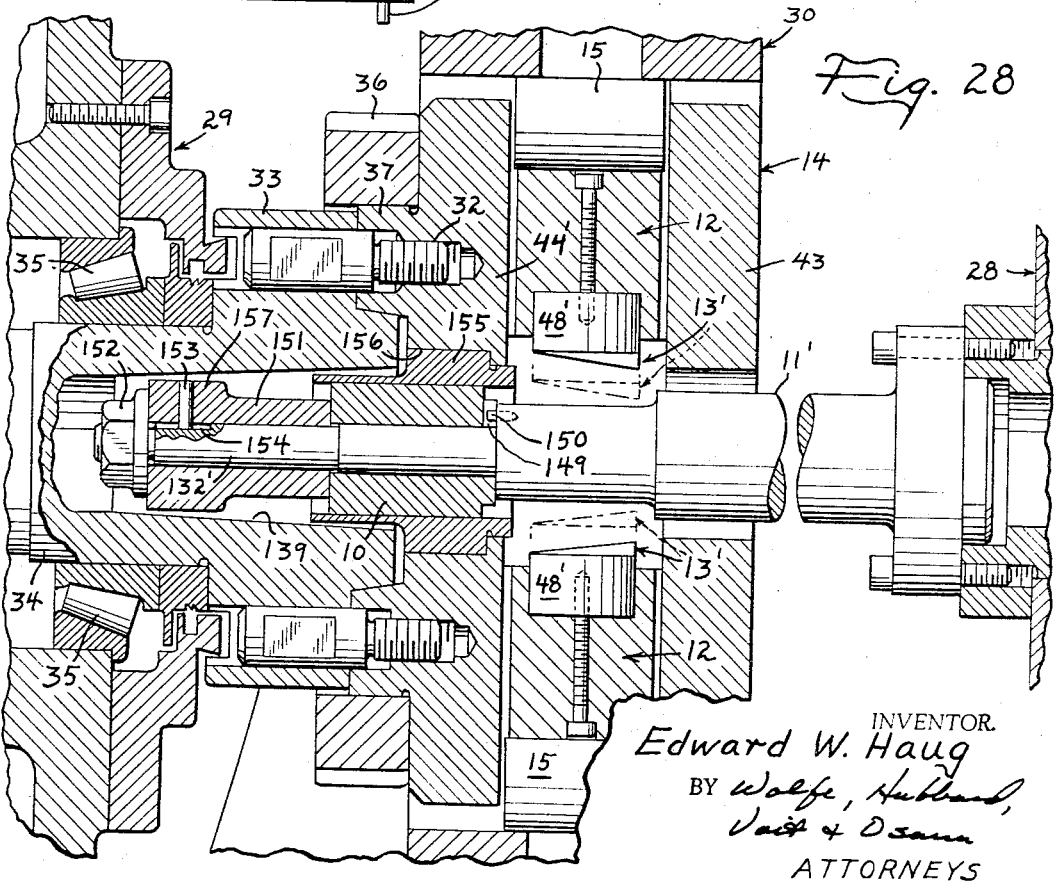
FIG. 28 is a view similar to FIG. 9 but shows the arrangement when using the tool of FIG. 14.

Instead of moving the cams 16 in progressively as the gear is formed, the cams may be set and kept at full depth and the work 10 advanced axially between tools 13' which are given a progressively changing shape to make successively deeper penetrations from one end to the other of the tools. Such an arrangement is shown in FIGS. 26 through 28 in which parts identical to those in the first embodiment are identified by the same reference characters and similar parts are identified by the same but primed reference characters.

In this instance, the reduced end portion 132' of the spindle 11' (FIG. 28) projects beyond the tool head 14 at the beginning of the operation and into the tapered bore 139 in the end of the head stock drive spindle 34. The gear blank 10 is received on this end portion and a pin 150 in the spindle projects into a slot 149 in the end of the blank to hold the two against relative turning. Beyond the gear blank is a sleeve 151 which is received on the spindle end portion 132' and is clamped against the blank by a nut 152 threaded onto the end of the spindle. A pin 153 extends radially through the sleeve 151 and projects into a slot 154 in the spindle to insure that the sleeve turns with the spindle. With this arrangement, the gear blank is fed from left to right as viewed in FIG. 28 to move the blank progressively through the tool head 14 and past the tools 13'.

To provide an outboard support for the work spindle 11', a bearing sleeve 155 is pressed into a central aperture 156 in the forward plate 44' of the tool head 14. The internal diameter of the sleeve is substantially the same as the diameter of the gear blank 10 so that the latter is supported in the bearing sleeve as it is advanced into the tool head. Before the blank leaves the sleeve, an enlargement 157 on the sleeve 151 enters the bearing sleeve and, also being of substantially the same diameter as the internal diameter of the bearing sleeve, provides continued support for the work spindle 11'.

The axial feed of the work spindle is achieved by sliding the carriage 28 along the ways on the lathe bed and, for this purpose, a nut 158 (FIG. 27) rigid with the carriage is threaded on a screw 159 driven from the gear box 160 of the lathe. The screw extends horizontally parallel to the ways and, since the nut 158 is held against turning, the carriage is moved along the ways as the screw is turned. With the axial feed of the work and the progressively changing shape of the tools 13', the cams 16 need only be preset to the position which causes the rear ends of the tools to penetrate the gear blank the full depth. This setting of the cams may be accomplished manually by a hand crank (not shown) slipped over the square end 161 of the shaft 67.

As is the case of the tools 13, each tool 13' is formed as a rib 18' (FIG. 14) integral with a plug 48' which is received in the counterbore 47 in the end of the slide 12. The plug 48' also is made with notches to define shoulders 52' for abutment by the set screws 51. This specific shape of the rib 18' constitutes the subject matter of my copending application Ser. No. 502,965, filed Oct. 23, 1965.

In general, the wide, shallow end of the rib is almost as wide as the space between the outer ends of two adjacent ones of the teeth ultimately formed. At the opposite end, the cross sectional shape of the rib is complemental to the interdental spaces of the final gear. As illustrated in FIGS. 18 through 21, the two ends of the rib 18' are connected by side surfaces 162 and by a slightly curved outer surface 163 which is the impacting surface of the tool. Preferably, the curvature of the surface 163 is such that, at equal increments along the rib, the tool displaces substantially identical amounts of metal.

In operation, the workpiece 10 first is engaged by the shallow end of the rib 18' as illustrated in FIG. 18a. The impact at this point displaces some metal from under the rib and the metal flows up around the side surfaces 162 of the rib. The resulting embryo tooth form substantially matches the shape of the outer ends of the ultimate gear teeth. Similarly, as shown in FIGS. 18b, c, and d, the axial feed of the workpiece causes each successive impact to form the next lower part of each gear tooth until the final shape of the tooth is given by the last impact (FIG. 18e). In this way, the metal flow is substantially radial of the workpiece and there is little or no side pressure which might tend to bend and weaken the teeth. Of course, similar successions of impacts are made at all of the interdental spaces due to the difference in the speeds of rotation of the work and the tool head 14.

A circular tool may also be used with the arrangement where the work is fed past the tool and such a tool is shown in FIGS. 15 and 16. In this case, the tool 13" includes a circular rib 18" which has a radial cross section complemental to the shape of the gear teeth and which is formed integrally with a short shaft 164 intermediate the ends thereof. The ends of the shaft are journaled in blocks 165 whose outer sides are semi-cylindrical to be received in the bore 47 in the slide 12. As shown in FIG. 16, the undersides of the blocks 165 are secured by bolts 166 to a round plate 167 which, in turn, is held in the slide 12 by the bolt 49.

With the foregoing arrangement, the workpiece is advanced past the tool 13" just as in the case of the tool 13'. The circular shape of the rib 18" results in progressively deeper penetrations as the work is advanced until each point along the workpiece has been formed completely. In this respect, the action is much the same as that produced by the inclined rib 18' of the tool of FIG. 14. The shaft 164 is freely rotatable in the blocks 165 and, thus, a different part of the rib 18″ is presented to the work upon each impact.

FIGS. 29, 30 and 31 illustrate the manner in which the machine may be adapted to form a helical gear 168. Preferably the tapered tool of FIG. 14 is used although the circular tool of FIG. 15 may be employed instead. As shown in FIG. 30, one of the screws 51 is backed off and the other is threaded in to turn the plug 48′ and disposes the rib 18′ at an angle correlated with the helix angle of the gear 168 to be formed.

In addition to disposing the tool rib 18′ at the helix angle, it also is necessary to impart an added turning of the tool relative to the work so that the rib follows the helix angle on the gear blank during successive impacts. Herein, this is achieved by turning the work spindle 11″ through a variable drive mechanism similar to the mechanism 89 of FIG. 7 and simultaneously turning the spindle an additional amount correlated with the helix angle. To this end, the work spindle is journaled within a sleeve 169 which is driven by the mechanism 89 and which, in turn, drives the spindle with the desired cyclical motion. At the same time, the spindle is turned progressively relative to the sleeve to compensate for the helix angle.

As illustrated in FIG. 29, a gear 95′ replaces the gear 95 of FIG. 7 and meshes with the gear 94. The gear 95′ is keyed to the sleeve 169 to turn with the cyclical motion imparted by the mechanism 89. Rigid with the forward end of the sleeve is a collar 170 which, by means of bolts 171 (FIG. 31), carries a bracket 172. Two laterally spaced rollers 173 are journaled on the bracket to turn about upright axes and engage opposite sides of a helical rib 174 on the work spindle 11″. The rib is formed by cutting helical grooves 175 in the spindle. Thus, as the spindle is moved axially relative to the sleeve 169, the rollers 173 act on the rib 174 and cause the spindle to turn in the sleeve. Such turning compensates for the helix angle of the gear being formed and the angle of the rib 174 together with the rate at which the spindle moves axially of the sleeve are correlated with the gear's helix angle.

To advance the work spindle 11″ axially relative to the sleeve 169, a reduced extension 176 (FIG. 29) on the rear of the spindle projects into an auxiliary sleeve 177 which is supported by and journaled on the spindle extension by means of bearings 178. The latter permit the extension and the auxiliary sleeve to turn relative to each other but cause the two to move axially together. The outer surface of the sleeve 177 is threaded as indicated at 179 and receives an internally threaded pulley 180 driven at a constant speed from a suitable power source (not shown) through a belt 181. The sleeve is held against rotation by a key 183 which is rigid with the carriage and projects into a slot in the thread 179. The pulley is disposed within an extension 182 of the carriage housing and this holds the pulley in a fixed axial position relative to the carriage 28.

Thus, during the gear forming operation, the tool head 14 and the main sleeve 169 turn together with cyclical relative speeds the same as the tool head and the work spindle in FIG. 26. The turning of the sleeve is transmitted to the work spindle 11″ by the rollers 173 and the rib 174. At the same time, the pulley 180 is turned by the belt 181 and, due to the threaded relationship of the pulley and the auxiliary sleeve 179, the latter moves axially forward relative to the main sleeve 169. Because the rib 174 is helical, this relative movement adds a turning motion to the rotation of the work spindle and this added turning is correlated with the feed of the work past the tool head to cause the tool 18′ to follow the helix angle of the gear being formed.

It will be observed that the present invention provides a comparatively inexpensive means for making gears. At the same time, the gears are accurately formed. Moreover, it not only is possible to produce ordinary spur gears but helical gears also may be made according to the invention.

I claim as my invention:

1. A machine for forming teeth on a cylindrical workpiece comprising a spindle adapted to support the workpiece, a tool support mounted for rotation about the longitudinal axis of said spindle, a pair of slides mounted on diametrically opposite sides of said tool support and each operable to move radially of said axis and toward and away from the workpiece, a tool mounted on the inner end of each of said slides to oppose the periphery of the workpiece and having a shape correlated to the shape of a tooth to be formed, drive mechanism for rotating said spindle and said tool support about said axis but at different angular speeds whereby the tool support turns angularly relative to the spindle, and cam mechanism operable in timed relation to said drive mechanism to move said slides inwardly after each time said tool support turns relative to said spindle through an angle equal to the angular spacing of the teeth on the workpiece whereby said tools impact the periphery of the workpiece and successively form the teeth.

2. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank and having a shape correlated to the shape of a tooth on the gear to be formed, drive mechanism for rotating said spindle and said tool support about said axis but at different angular speeds whereby the tool support turns angularly relative to the spindle, and cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, said cam mechanism comprising a cam follower on the outer end of said slide and a non-rotatable cam disposed adjacent said tool support to engage said cam follower once during each revolution of the tool support and cam the slide radially inwardly.

3. A machine for forming a gear from a gear blank comprising a spindle adapted to support the gear blank, a tool disposed adjacent said gear blank means supporting said tool support for rotation about the longitudinal axis of said spindle, a slide mounted on said tool support to move radially of said axis and toward and away from the gear blank, a tool mounted on the inner end of said slide to oppose the periphery of the gear blank and having a shape correlated to the shape of a tooth on the gear to be formed, drive mechanism for rotating said spindle and said tool support about said axis but at different angular speeds whereby the tool support turns angularly relative to the spindle, and cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, said cam mechanism being responsive to the rotation of said tool support and operable to move said slide at predetermined angular positions of the tool support.

4. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank and having a shape correlated to the shape of a tooth on the gear to be formed, cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, and drive mechanism operable to rotate said spindle and said tool support at substantially the same angular speed when the tool impacts the gear blank and then at different speeds to index the spindle relative to the tool support.

5. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from a gear blank, a tool mounted on the inner end of said slide to oppose the periphery of the gear blank and having a shape correlated to the shape of a tooth on the gear to be formed, drive mechanism for rotating said spindle and said tool support about said axis but at different angular speeds whereby the tool support turns angularly relative to the spindle, and cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears.

6. A machine for forming teeth on a cylindrical workpiece comprising, a spindle adapted to support the workpiece, a tool support disposed adjacent said workpiece, a slide mounted on said tool support to move radially of said spindle and toward and away from said workpiece, a tool mounted on the inner end of said slide to oppose the periphery of the workpiece and having a shape correlated to the shape of the teeth to be formed, means for rotating said spindle relative to said tool support through successive angular advances and intervening periods of relative dwell, each of said advances being equal to a multiple angular spacing of the teeth to be formed, and actuating mechanism operable during each dwell to move said slide inwardly whereby said tool impacts the workpiece and successively forms the teeth.

7. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank and having a shape correlated to the shape of a tooth on the gear to be formed, cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, drive mechanism operable to rotate said spindle and said tool support at substantially the same angular speed when the tool impacts the gear blank and then at different speeds to index the spindle relative to the tool support, said cam mechanism comprising a cam follower on the outer end of said slide and a non-rotatable cam disposed adjacent said tool support to engage said cam follower once during each revolution of the tool support and cam the slide radially inwardly, and means operable to move said cam progressively inwardly toward said spindle whereby said tool penetrates said gear blank deeper upon each successive impact.

8. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank and having a shape correlated to the shape of a tooth on the gear to be formed, cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, and drive mechanism operable to rotate said spindle and said tool support at substantially the same angular speed when the tool impacts the gear blank and then at different speeds to index the spindle relative to the tool support, said cam mechanism comprising a cam follower on the outer end of said slide and a non-rotatable cam disposed adjacent said tool support to engage said cam follower once during each revolution of the tool support and cam the slide radially inwardly.

9. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank and having a shape correlated to the shape of a tooth on the gear to be formed, drive mechanism for rotating said spindle and said tool support about said axis but at different angular speeds whereby the tool support turns angularly relative to the spindle, cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, and feed mechanism operable in timed relation to said drive and cam mechanisms to advance said tool support axially relative to said spindle and feed said tool progressively along the periphery of said gear blank.

10. A machine for forming a gear from a gear blank comprising, a spindle adapted to support the gear blank, a tool support disposed adjacent said gear blank, a slide mounted on said tool support to move radially of said spindle and toward and away from said gear blank, a tool mounted on the inner end of said slide to oppose the periphery of the gear blank and having a shape correlated to the shape of a tooth on the gear to be formed, means for rotating said spindle relative to said tool support through successive angular advances and intervening periods of relative dwell, each of said advances being equal to the angular spacing of the teeth on the gear to be formed, actuating mechanism operable during each dwell to move said slide inwardly whereby said tool impacts the gear blank and successively forms the teeth of the gear, and feed means operable to advance said tool support axially relative to said spindle and feed said tool progressively along the periphery of said gear blank.

11. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank and having an elongated rib extending longitudinally of said spindle, the shape of said rib at one end being complemental to the shape of the teeth on the gear to be formed and tapering gradually to a substantially shallower shape at the other end, cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, drive mechanism operable to rotate said spindle and said tool support at substantially the same angular speed when the tool impacts the gear blank and then at different speeds to index the spindle relative to the tool support, said cam mechanism comprising a cam follower on the outer end of said slide and a non-rotatable cam disposed adjacent said tool support to engage said cam follower once during each revolution of the tool support and cam the slide radially inwardly, and feed means operable to advance said tool support axially relative to said spindle to feed said rib into said gear blank beginning at the shallow end and progressing to said complementally shaped end.

12. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank and having an elongated rib extending longitudinally of said spindle, the shape of said rib at one end being complemental to the shape of the teeth on the gear to be formed and tapering gradually to a substantially shallower shape at the other end, cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, drive mechanism operable to rotate said spindle and said tool support at substantially the same angular speed when the tool impacts the gear blank and then at different speeds to index the spindle relative to the tool support, and feed means operable to advance said tool support axially relative to said spindle to feed said rib into said gear blank beginning at the shallow end and progressing to said complementally shaped end.

13. A machine for forming a gear from a gear blank comprising, a spindle adapted to support the gear blank, a tool support disposed adjacent said gear blank, a slide mounted on said tool support to move radially of said spindle and toward and away from said gear blank, a tool mounted on the inner end of said slide to oppose the periphery of the gear blank and having an elongated rib extending longitudinally of said spindle, the shape of said rib at one end being complemental to the shape of the teeth on the gear to be formed and tapering gradually to a substantially shallower shape at the other end, means for rotating said spindle relative to said tool support through successive angular advances and intervening periods of relative dwell, each of said advances being equal to the angular spacing of the teeth on the gear to be formed, actuating mechanism operable during each dwell to move said slide inwardly whereby said tool impacts the gear blank and successively forms the teeth of the gear, and feed means operable to advance said tool support axially relative to said spindle to feed said rib into said gear blank beginning at the shallow end and progressing to said complementally shaped end.

14. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank, said tool comprising a cylindrical member rotatably mounted on the inner end of said slide and having an annular rib with a cross-sectional shape correlated to the shape of a tooth on the gear to be formed, cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, drive mechanism operable to rotate said spindle and said tool support at substantially the same angular speed when the tool impacts the gear blank and then at different speeds to index the spindle relative to the tool support, said cam mechanism comprising a cam follower on the outer end of said slide and a non-rotatable cam disposed adjacent said tool support to engage said cam follower once during each revolution of the tool support and cam the slide radially inwardly, and feed means operable to advance said tool support axially relative to said spindle to feed said rib progressively into said gear blank.

15. A machine for forming a gear from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank, said tool comprising a cylindrical member rotatably mounted on the inner end of said slide and having an annular rib with a cross-sectional shape correlated to the shape of a tooth on the gear to be formed, cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gears, drive mechanism operable to rotate said spindle and said tool support at substantially the same angular speed when the tool impacts the gear blank and then at different speeds to index the spindle relative to the tool support, and feed means operable to advance said tool support axially relative to said spindle and feed said rib progressively along said gear blank.

16. A machine for forming a gear from a gear blank comprising, a spindle adapted to support the gear blank, a tool support disposed adjacent said gear blank, a slide mounted on said tool support to move radially of said spindle and toward and away from said gear blank, a tool mounted on the inner end of said slide to oppose the periphery of the gear blank, said tool comprising a cylindrical member rotatably mounted on the inner end of said slide and having an annular rib with a cross-sectional shape correlated to the shape of a tooth on the gear to be formed, means for rotating said spindle relative to said tool support through successive angular advances and intervening periods of relative dwell, each of said advances being equal to the angular spacing of the teeth on the gear to be formed, actuating mechanism operable during each dwell to move said slide inwardly whereby said tool impacts the gear blank and successively forms the teeth of the gear, and feed means operable to advance said tool support axially relative to said spindle and feed said rib progressively along said gear blank.

17. A machine for forming a helical gear with a predetermined helix angle from a gear blank comprising a spindle adapted to support the gear blank, a tool disposed adjacent said gear blank, means supporting said tool support for rotation about the longitudinal axis of said spindle, a slide mounted on said tool support to move radially of said axis and toward and away from the gear blank, a tool mounted on the inner end of said slide to oppose the periphery of the gear blank and having a rib with a shape correlated to the shape of a tooth on the gear to be formed, said rib being disposed at an angle relative to the axis of said spindle equal to said helix angle, drive mechanism for rotating said spindle and said tool support about said axis but at different angular speeds whereby the tool support turns angularly relative to the spindle, cam mechanism operable in timed relation to said drive mechanism to move said slide inwardly each time said tool support turns relative to said spindle through an angle equal to the angular spacing of the teeth on the gear whereby said tool impacts the periphery of the gear blank and successively forms the teeth of the gear, means for advancing said tool support axially relative to said spindle to feed said tool along the periphery of the gear blank, and mechanism correlated with said advancing means and operable to add to the relative angular rotation of said tool support and said spindle an amount equal to said helix angle.

18. A machine for forming a helical gear with a predetermined helix angle from a gear blank comprising, a spindle adapted to support the gear blank, a tool support disposed adjacent said gear blank, a slide mounted on said tool support to move radially of said spindle and toward and away from said gear blank, a tool mounted on the inner end of said slide to oppose the periphery of the gear blank and having a rib with a shape correlated to the shape of a tooth on the gear to be formed, said rib being disposed at an angle relative to the axis of said spindle equal to said helix angle, means for rotating said spindle relative to said tool support through successive angular advances and intervening periods of relative dwell, each of said advances being equal to the angular spacing of the teeth on the gear to be formed, actuating mechanism operable during each dwell to move said slide inwardly whereby said tool impacts the gear blank and successively forms the teeth of the gear, means for advancing said tool support axially relative to said spindle to feed said tool along the periphery of the gear blank, and mechanism correlated with said advancing means and operable to add to the relative angular rotation of said tool support and said spindle an amount equal to said helix angle.

19. A machine as defined in claim 6 in which there are two slides mounted on diametrically opposite sides of said workpiece and in which there are two tools, one mounted on the inner end of each of said slides.

20. A machine as defined in claim 4 in which the shape of said tool is complemental to the shape of the tooth to be formed on said gear.

21. A machine as defined in claim 6 in which the shape of said tool is complemental to the shape of the tooth to be formed on said workpiece.

References Cited

UNITED STATES PATENTS

| | | | |
|---|---|---|---|
| 460,566 | 10/1891 | Dayton | 72—402 |
| 2,642,762 | 6/1953 | Evans | 72—76 |
| 2,905,033 | 9/1959 | Grob | 72—76 |
| 3,084,571 | 4/1963 | Appel | 72—402 |
| 3,130,611 | 4/1964 | Specht | 72—402 |

CHARLES W. LANHAM, Primary Examiner.

L. A. LARSON, Assistant Examiner.